Patented June 6, 1939

2,160,933

UNITED STATES PATENT OFFICE 2,160,933

POLYMERIZATION OF VINYLIDENE HALIDES

Ralph M. Wiley, Midland, Mich., assignor to The Dow Chemical Company, Midland, Mich., a corporation of Michigan No Drawing. Application June 4, 1937, Serial No. 146,418

8 Claims. (Cl. 260—80)

This invention relates to a method and to an improved catalyst for the polymerization of vinylidene halides, i. e. vinylidene chloride, bromide and chlorobromide.

The polymers of vinylidene halides and copolymers thereof with other polymerizable materials are valuable substances which can be employed in the preparation of molded articles, films, filaments, and the like. These compounds, however, polymerize very slowly in the presence of light, air, and/or many of the catalysts heretofore proposed for the polymerization of other unsaturated compounds. It is necessary, therefore, to provide a process and improved catalyst whereby vinylidene halides can be caused to polymerize rapidly, either alone, or in the presence of a material co-polymerizable therewith, in order that the polymeric product may be obtained on a commercial basis.

The present invention is an improvement on the catalyst composition described and claimed in my co-pending application Serial Number 125,829, filed February 15, 1937. In the aforesaid co-pending application, it was pointed out that while tetraethyl lead alone is not effective in promoting the polymerization of vinylidene halides, mixtures thereof with other materials such as the polyhalo oxygen-containing organic compounds selected from the group consisting of the polyhalo phenols, polyhalo hydrocarbon substituted phenols, chloroacetyl chloride, and polyhalo-aryl ethers formed a very active catalytic mixture capable of markedly accelerating the rate of polymerization of vinylidene halides and mixtures thereof with other polymerizable materials.

I have now discovered that although copper and copper compounds are known to be inhibitors for the polymerization of vinyl esters such as vinyl acetate, etc., the addition of copper or certain copper compounds to the catalyst complex described and claimed in the aforesaid copending application, materially increases the rate of polymerization of vinylidene halides and of mixtures thereof with other polymerizable materials even over that obtained through the use of my prior catalyst mixture. This effect is especially marked at temperatures near room temperature.

My improved catalyst mixture containing copper or copper compounds has been found to be effective in the polymerization of vinylidene halides even though these may contain materials previously added thereto for the purpose of preventing their polymerization. For example, it has been suggested to preserve monomeric vinylidene halides by the use of small amounts of phenol, thereby to prevent polymerization until such time as it is desired to polymerize or otherwise employ said vinylidene halide. While it is a simple matter to separate monomeric vinylidene halide from phenol or other high-boiling inhibitors, this step is no longer necessary when polymerization is carried out in the presence of the new copper-containing catalyst composition.

Since copper and its salts were found materially to increase the rate of polymerization of vinylidene halides and their mixtures with other polymerizable compounds, an attempt was made to employ other metals and their salts to accomplish a similar result. In most cases the metals employed, when substituted for copper in the catalyst mixture, did not increase the rate or extent of polymerization, and in some cases these metals resulted in a decrease in the rate of polymerization. Some few metals, such as iron, silver, molybdenum, and aluminum, increase the polymerization rate slightly but not to the extent exhibited by copper.

The following tables illustrate the use of copper and copper salts, and other metals, in catalysts for the polymerization of vinylidene halides. With the exception of the metal or metal salt employed, the mixtures subjected to polymerization in each of the experiments described in the tables were substantially the same, weighing 32 grams, and consisting of 73 per cent by weight of vinylidene chloride and 27 per cent by weight of vinyl chloride. To this mixture was added in each case a catalyst comprising equal parts of benzoyl peroxide, tetraethyl lead, and chloroacetyl chloride, said catalyst being equivalent in weight to 1.5 per cent of the polymerizable mixture. There was also added as a stabilizing agent, 1.0 gram of ethylene oxide or of phenoxy-propylene oxide. Those tests in which ethylene oxide was employed as the stabilizer are identified in the tables by the letter "E" following the number of the test. Similarly, the letter "P" signifies those tests in which phenoxypropylene oxide was employed. To the mixture, which had been prepared at a temperature substantially below room temperature to minimize evaporation losses during handling, was then added 0.16 gram of metal or metal salts. The nature of this added ingredient and the form in which it was employed are shown in the tables. Table I shows the results of a series of tests carried out at 30° C. while Table II indicates the effect of the various metals and salts at 50° C.

Table I

| Run No. | Material added to catalyst | 20 hrs. | 40 hrs. | 60 hrs. | 80 hrs. | 100 hrs. | 120 hrs. | 140 hrs. | Comments |
|---|---|---|---|---|---|---|---|---|---|
| 1—P | | 1.6 | 3.2 | 4.8 | 6.5 | 8.0 | 9.5 | 10.8 | |
| 2—E | | 2.0 | 4.0 | 5.6 | 6.7 | 7.6 | | | (a) |
| 3—P | Copper strip | 7.0 | 12.6 | 16.6 | 20.0 | 22.8 | 25.0 | 26.7 | |
| 4—E | do | 7.2 | 9.4 | 10.6 | 11.0 | 11.3 | 11.3 | | (a) |
| 5—P | Copper salicylate | 1.5 | 2.8 | 4.4 | 5.8 | 6.8 | 7.8 | 8.5 | (a), (b) |
| 6—E | do | 3.8 | 6.6 | 9.2 | 10.6 | 11.4 | 12.0 | 12.4 | (c) |
| 7—E | do | 6.4 | 8.0 | 8.7 | 9.0 | 9.0 | | | (a), (c) |
| 8—P | do | 12.8 | 16.8 | | | | | | |
| 9—P | do | 8.2 | 12.2 | 13.5 | 13.9 | 14.0 | 14.0 | 14.0 | (a) |
| 10—P | Copper powder | 16.0 | 21.0 | | | | | | |
| 11—P | Iron | | 4.8 | | 10.0 | | | | |
| 12—P | Molybdenum | | | 8.6 | 12.0 | | | | |
| 13—P | Aluminum | | | 6.0 | | 6.0 | | | |
| 14—P | Silver | | | 3.4 | | | | 11.4 | |
| 15—P | Manganese | | | | | 7.0 | | 9.0 | |
| 16—P | Tungsten | | | | | | | 7.4 | |
| 17—P | Selenium | | | | | | | 7.4 | |
| 18—P | Magnesium | | | | | | | 6.6 | |
| 19—P | Nickel | | | | | | | 5.2 | |
| 20—P | Tin foil | | | | | | | 4.7 | |

(a) Vinylidene chloride employed in this run contained phenol as a polymerization inhibitor.

(b) The vinylidene chloride-vinyl chloride-catalyst mixture, and copper salicylate were shaken together at a temperature below that at which polymerization occurs, and the copper salicylate was removed by filtration before heating to polymerizing temperature.

(c) The copper salicylate catalyst was employed in the form of an alcoholic solution, in the amount of 0.001 per cent of catalyst and 0.15 per cent ethanol, based on the weight of polymerizable materials.

Table II

| Run No. | Material added to catalyst | 20 hrs. | 40 hrs. | 60 hrs. | 80 hrs. | 100 hrs. | 120 hrs. | 140 hrs. | 160 hrs. | Comments |
|---|---|---|---|---|---|---|---|---|---|---|
| 1—P | | 9.8 | 16.7 | 22.2 | 26.4 | 30.0 | | | | |
| 2—E | | 5.8 | 9.0 | 11.0 | 12.3 | 12.9 | 13.4 | 14.0 | | (a) |
| 3—E | Copper salicylate | 7.6 | 11.6 | 14.0 | 15.6 | 17.0 | 18.2 | 19.5 | 20.7 | (c) |
| 4—E | do | 6.0 | 7.4 | 8.1 | 8.2 | 8.2 | | | | (a), (c) |
| 5—P | do | 6.0 | 10.6 | 14.6 | 18.0 | 20.9 | 23.6 | 25.9 | | (a), (b) |
| 6—P | do | 15.6 | 16.0 | | | | | | | |
| 7—P | do | 11.2 | 11.6 | 11.7 | 11.8 | 11.9 | 12.0 | 12.1 | | (a) |
| 8—P | Copper strip | 17.4 | 25.0 | | | | | | | |
| 9—E | do | 10.6 | 12.8 | 14.0 | 14.7 | 15.0 | 15.2 | 15.2 | 15.2 | (a) |
| 10—P | Copper powder | 18.0 | 23.2 | | | | | | | |
| 11—P | Silver | 14.0 | 18.8 | | | | | | | |
| 12—P | Molybdenum | 12.2 | 14.4 | | | | | | | |
| 13—P | Iron | | | 11.0 | 17.0 | | | | | |
| 14—P | Aluminum | | | 10.0 | 13.0 | | | | | |
| 15—P | Selenium | | | 14.4 | 17.4 | 20.2 | | | | |
| 16—P | Manganese | | | 8.6 | 11.2 | | | | | |
| 17—P | Tungsten | | | 7.0 | 12.6 | | | | | |

(a) Vinylidene chloride employed in this run contained phenol as a polymerization inhibitor.

(b) The vinylidene chloride-vinyl chloride-catalyst mixture, and copper salicylate were shaken together at a temperature below that at which polymerization occurs, and the copper salicylate was removed by filtration before heating to polymerizing temperature.

(c) The copper salicylate catalyst was employed in the form of an alcoholic solution, in the amount of 0.001 per cent of catalyst and 0.15 per cent ethanol, based on the weight of polymerizable materials.

It will be noted that none of the metals other than copper, iron, molybdenum, silver, and aluminum aided the polymerization appreciably, and that copper and its salts were outstanding. In the runs in which copper salicylate was employed, considerable variation was encountered, depending to a large extent upon the form in which this material was added to the polymerizable mixture. For example, when copper salicylate was added to the mixture and shaken therewith at temperatures below polymerization temperature and then filtered from the mixture, no advantageous results were obtained when the mixture was co-polymerized. When copper salicylate was dissolved in alcohol and added to the vinylidene chloride-vinyl chloride mixture, a slight advantage was obtained both in the case of inhibited and non-inhibited vinylidene chloride, even though a very low concentration of catalyst was employed. The improvement due to the copper and its salts is considerably more noticeable at 30° C. than at 50° C.

A further series of studies was made in which the effect of each of the components of the catalyst mixture, i. e. benzoyl peroxide, tetraethyl lead, chloroacetyl chloride, and copper, on the extent of polymerization of freshly distilled vinylidene chloride was determined. These studies were made at temperatures of 30° and 50° C. It was found that when all four of the catalytic agents were employed, the yield of polymer was approximately 60 per cent greater than when copper was omitted from the mixture, polymerization being carried out at 50° C. Similarly, at 30° C. the presence of copper in the catalyst mixture increased the yield of polymer nearly three-fold. When a catalyst mixture was employed comprising benzoyl peroxide, tetraethyl lead, and copper, the presence of copper increased the amount of polymer by about 50 per cent over that obtainable at either 30° or 50° C. when benzoyl peroxide and tetraethyl lead were employed alone. The addition of copper to a catalyst consisting of benzoyl peroxide and chloroacetyl chloride appeared to reduce the yield of polymer by about 50 per cent, whereas a very slight increase in yield was noted when benzoyl peroxide and copper were used as compared with runs carried out employing benzoyl peroxide alone. It appears from the foregoing results that tetraethyl lead and chloroacetyl chloride or its equivalent, i. e. phosgene or other polyhalo oxygen-containing organic compounds selected from the group previously defined, are essential to the catalyst mixture if the best results are to be obtained, and that when these materials are present, copper materially increases their effectiveness.

The invention has been illustrated with respect to the polymerization of vinylidene chloride and of its mixtures containing vinyl chloride. It is equally applicable to the polymerization of other vinylidene halides, i. e. vinylidene bromide and vinylidene chloro-bromide, and to the mixtures of any of the vinylidene halides with vinyl compounds such as vinyl chloride, vinyl bromide, vinyl acetate, styrene, etc., or other co-polymerizable materials, such as the acrylates and divinyl ether.

Copper compounds other than copper salicylate may be employed. Suitable examples are copper oxide, copper chloride, copper sulphide, copper sulphate, copper acetate, copper glycollate, copper benzoate, etc.

Other modes of applying the principle of my invention may be employed instead of those explained, change being made as regards the materials herein disclosed, provided the step or steps stated by any of the following claims or the equivalent of such stated step or steps be employed.

I therefore particularly point out and distinctly claim as my invention:

1. The method which comprises polymerizing a vinylidene halide in the presence of a catalyst mixture consisting of tetraethyl lead, an oxygenating agent, a poly-halo oxygen-containing organic compound selected from the group consisting of poly-halo phenols, poly-halo hydrocarbon-substituted phenols, chloroacetyl chloride, and poly-halo aryl ethers, and a material selected from the group consisting of copper, copper oxide, and copper salts.

2. The method according to claim 1 in which a mixture of a vinylidene halide and a co-polymerizable vinyl compound is polymerized.

3. The method according to claim 1 in which vinylidene chloride is polymerized.

4. The method according to claim 1 in which a mixture of vinylidene chloride and a co-polymerizable vinyl compound is polymerized.

5. The method which comprises polymerizing vinylidene chloride in the presence of a catalyst mixture consisting of tetraethyl lead, copper, an oxygenating agent, and a poly-halo oxygen-containing organic compound selected from the group consisting of poly-halo phenols, poly-halo hydrocarbon-substituted phenols, chloroacetyl chloride, and poly-halo aryl ethers.

6. The method which comprises polymerizing a mixture of vinylidene chloride and a co-polymerizable vinyl compound in the presence of a catalyst mixture consisting of tetraethyl lead, copper, an oxygenating agent, and a poly-halo oxygen-containing organic compound selected from the group consisting of poly-halo phenols, poly-halo hydrocarbon-substituted phenols, chloroacetyl chloride, and poly-halo aryl ethers.

7. The method which comprises polymerizing vinylidene chloride in the presence of a catalyst mixture consisting of tetraethyl lead, copper salicylate, an oxygenating agent, and a poly-halo oxygen-containing organic compound selected from the group consisting of poly-halo phenols, poly-halo hydrocarbon-substituted phenols, chloroacetyl chloride, and poly-halo aryl ethers.

8. The method which comprises polymerizing a mixture of vinylidene chloride and a co-polymerizable vinyl compound in the presence of a catalyst mixture consisting of tetraethyl lead, copper salicylate, an oxygenating agent, and a poly-halo oxygen-containing organic compound selected from the group consisting of poly-halo phenols, poly-halo hydrocarbon-substituted phenols, chloroacetyl chloride, and poly-halo aryl ethers.

RALPH M. WILEY.